United States Patent [19]

Hess et al.

[11] 4,100,224

[45] Jul. 11, 1978

[54] STABLE ORGANIC DISPERSIONS WHICH CAN BE CURED WITH LITTLE SHRINKAGE, BASED ON UNSATURATED POLYESTER RESINS AND THERMOPLASTIC POLYMERS

[75] Inventors: Bernhard Hess, Moers; Karl Raichle, Krefeld; Ludwig Bottenbruch, Krefeld; Hansjochen Schulz-Walz, Krefeld; Heinrich Alberts, Cologne, all of Fed. Rep. of Germany

[73] Assignee: Bayer Aktiengesellschaft, Fed. Rep. of Germany

[21] Appl. No.: 669,285

[22] Filed: Mar. 22, 1976

[30] Foreign Application Priority Data

Mar. 26, 1975 [DE] Fed. Rep. of Germany ....... 2513255

[51] Int. Cl.² ............................................. C08L 67/06
[52] U.S. Cl. ............................ 260/862; 260/29.2 UA; 260/29.2 E; 260/29.6 NR; 260/872
[58] Field of Search ......................... 260/862, 29.6 NR

[56] References Cited

U.S. PATENT DOCUMENTS

| | | | |
|---|---|---|---|
| 3,331,796 | 7/1967 | Gilbert et al. | 260/862 X |
| 3,740,353 | 6/1973 | Patrick et al. | 260/862 X |
| 3,993,710 | 11/1976 | Alberts et al. | 260/862 |

FOREIGN PATENT DOCUMENTS 1,241,983  6/1967  Fed. Rep. of Germany.

*Primary Examiner*—Walter C. Danison
*Attorney, Agent, or Firm*—Connolly and Hutz

[57] ABSTRACT

Organic dispersions which can be cured with little shrinkage and are based on unsaturated polyester, copolymerizable vinyl or vinilydene compounds, thermoplastic polymers which are colloidally soluble and are incompatible with the polyester resin and an ethylene/vinyl acetate copolymer with high vinyl acetate contents show a good stability.

5 Claims, No Drawings

STABLE ORGANIC DISPERSIONS WHICH CAN BE CURED WITH LITTLE SHRINKAGE, BASED ON UNSATURATED POLYESTER RESINS AND THERMOPLASTIC POLYMERS

The present invention relates to stable organic dispersions, which can be cured with little shrinkage, based on α,β-ethylenically unsaturated polyester resins, certain thermoplastic polymers and ethylene/vinyl acetate copolymers as dispersing agents.

Conventional unsaturated polyester resins shrink considerably on polymerisation, which is a severe disadvantage in the manufacture of mouldings which are intended to have perfect surfaces. Now it is known from numerous publications (DT-OS (German Published Specification) No. 1,192,820, DT-AS (German Published Specification) No. 1,694,857, DT-OS (German Published Specification) Nos. 1,803,345, 1,953,062, 2,051,663 and 2,061,585 and French patent specification No. 1,148,285(that polyester moulding materials to which certain thermoplastics, for example polyacrylates, polymethacrylates or cellulose esters, have been admixed before curing, can be cured with little shrinkage.

Thermoplastics, suitable for reducing the shrinkage on polymerisation, which have hitherto been proposed are both those which are soluble at room temperature in copolymerisable vinyl or vinylidene compounds and/or the polyester resin, that is to say in the solution of the polyester in copolymerisable compounds, and those which, though soluble in the copolymerisable compounds at room temperature, are incompatible with the polyester. The first group includes, for example, polyvinyl acetate and cellulose esters and the second mentioned group includes, for example, polystyrene, polyacrylic acid esters and polymethacrylic acid esters. The use of thermoplastics which are soluble neither in the polyester resin nor in the copolymerisable compounds, but only swell, such as, for example, polyethylene, has hitherto found no acceptance in industry, because of technical difficulties.

Most conveniently, the polyester, vinyl or vinylidene compound and thermoplastic which reduces shrinkage are mixed by combining the solutions of the polyester in the vinyl or vinylidene compound and of the thermoplastic in the vinyl or vinylidene compound at room temperature or slightly elevated temperature. In the case of the first group of thermoplastics, this procedure gives, without problems, clear colloidal solutions, whilst the addition of thermoplastic solutions of the second group, because of their incompatibility with polyester resin, gives dispersions which demix more or less rapidly.

Because, however, in the case of polyester resin/thermoplastic dispersions the shrinkage on polymerisation depends greatly on the distribution of the thermoplastic in the polyester resin, small particle sizes and reproducible particle size distribution of the thermoplastic droplets in the dispersion are definitely desirable for constant quality of the cured mouldings. There thus existed a need for stabilisation of such dispersions, so that the change in the thermoplastic particle sizes occurring on demixing can be avoided.

DT-OS (German Published Specification) No. 2,402,739 has disclosed a stabilised polyester resin/thermoplastic composition, which can be cured with little shrinkage, and which contains a stabilising agent "which is a block copolymer of the formula $$B_x\text{-}CH_2CH_2(OCH_2CH_2)_y OH \text{ or}$$

$$HO(CH_2CH_2O)_y CH_2CH_2\text{-}B_x\text{-}CH_2CH_2(OCH_2CH_2)_y OH$$

wherein
B is a monoalkenyl-aromatic monomer, a conjugated diene monomer or a mixture of the same polymerised in a block segment and
x and y each have a value of at least about 25".

The preparation of these stabilisers (compare U.S. patent specification No. 3,050,511) according to DT-OS (German Published Specification) No. 2,402,739 is complicated and arouses the need for stabilisers which are accessible with less effort.

It has now been found that stable solutions can be manufactured by mixing the two incompatible solutions in the presence of selected ethylene/vinyl acetate copolymers. The subject of the invention are organic dispersions, which can be cured with little shrinkage, based on
(A) 20 – 70, preferably 30 – 50, % by weight, based on the sum of the components A-C, of α,β-ethylenically unsaturated polyesters,
(B) 70 – 20, preferably 60 – 40, % by weight, based on the sum of the components A-C, of copolymerisable vinyl or vinylidene compounds,
(C) 3 – 30, preferably 5 – 20, % by weight, based on the sum of the components A-C, of thermoplastic polymers which at room temperature are colloidally soluble in the component B and are incompatible with a polyester resin comprising A + B and
(D) 0.001 – 20, preferably 0.5 – 10, % by weight, based on the sum of the components A-C, of ethylene/vinyl acetate copolymers with vinyl acetate contents of 50 – 80, preferably 60 – 75, % by weight and Mooney viscosities of 8 – 60, preferably of 45 – 65, Mooney, measured according to DIN 53,523 (L-4).

A further subject of the invention is a process for the manufacture of the dispersions according to the invention, according to which the components A to D are combined, in optional sequence, at room temperature or slightly elevated temperature (for example 20°–60° C) whilst stirring. Preferably, incompatible solutions of A + D in B and C in B, of A in B and C + D in B or A in B, C in B and D in B are combined with one another in a manner which is in itself known.

The dispersions according to the invention are especially useful for the manufacture of moulding compositions and pressing compositions.

α,β-Ethylenically unsaturated polyesters A for use in the dispersions of the invention are the customary polycondensation products of at least one α,β-ethylenically unsaturated dicarboxylic acid with, as a rule, 4 or 5 C atoms, or of their ester-forming derivatives, optionally mixed with up to 90 mol%, relative to the unsaturated acid component, of at least one aliphatic saturated dicarboxylic acid with 4 – 10 C atoms, or of a cycloaliphatic or aromatic dicarboxylic acid with 8 – 10 C atoms, or of their ester-forming derivatives with at least one polyhydroxy compound, especially a dihydroxy compound, with 2 – 8 C atoms, that is to say polyesters such as are described in J. Bjorksten et al, "Polyesters and their Applications", Reinhold Publishing Corp., New York 1956.

Examples of preferred unsaturated dicarboxylic acids, or their derivatives to be used are maleic acid or maleic anhydride and fumaric acid. However, it is also possible to use, for example, mesaconic acid, citraconic acid, itaconic acid or chloromaleic acid. Examples of the preferred aliphatic saturated, cycloaliphatic and aromatic dicarboxylic acids or their derivatives which may be used are phthalic acid or phthalic anhydride, isophthalic acid, terephthalic acid, hexahydrophthalic acid or tetrahydrophthalic acid or their anhydrides, endomethylenetetrahydrophthalic acid or its anhydride, succinic acid or succinic anhydride and succinic acid esters and chlorides, glutaric acid, adipic acid and sebacic acid. In order to manufacture resins of low inflammability it is possible to use, for example, hexachloroendomethylenetetrahydrophthalic acid (Het-acid), tetrachlorophthalic acid or tetrabromophthalic acid. Polyesters to be used preferentially contain maleic acid of which up to 25 mol% can be replaced by phthalic acid or isophthalic acid. As dihydric alcohols it is possible to employ ethylene glycol, 1,2-propanediol, 1,3-propanediol, diethylene glycol, triethylene glycol, dipropylene glycol, 1,3-butanediol, 1,4-butanediol, neopentyl glycol, 1,6-hexanediol, 2,2-bis-(4-hydroxycyclohexyl)-propane, bis-oxalkylated bisphenol A, perhydrobisphenol and others. The use of ethylene glycol, 1,2-propanediol, diethylene glycol, dipropylene glycol and neopentyl glycol is preferred.

Further modifications are possible by incorporating up to 10 mol %, based on the alcohol or acid component, of monohydric or polyhydric alcohols with 1 – 6 C atoms, such as methanol, ethanol, butanol, allyl alcohol, benzyl alcohol, cyclohexanol and tetrahydrofurfuryl alcohol, trimethylolpropane, glycerol and pentaerythritol as well as mono-, di- and tri-allyl ethers and benzyl ethers of trihydric and polyhydric alcohols with 3 – 6 C atoms, according to DT-AS (German Published Specification) No. 1,024,654, as well as by incorporating monobasic acids such as benzoic acid, or long-chain unsaturated fatty acids such as oleic acid, linseed oil fatty acid and dehydrated castor acid.

The acid number of the polyesters A should be between 10 and 100, preferably between 20 and 70, the OH numbers should be between 10 and 150, preferably between 20 and 100, and the molecular weights $\overline{M}_n$ should be between about 500 and 5,000, preferably between about 1,000 and 3,000 (measured by vapour pressure osmometry in dioxane and acetone; if the values differ, the lower value is regarded as the more correct value).

Admittedly, the content of the radicals of the $\alpha,\beta$-ethylenically unsaturated dicarboxylic acids co-condensed in the polyester A can vary within a wide range; since the articles produced from the moulding materials according to the invention are released from the mould, after pressing, whilst hot and therefore should have a satisfactorily high heat distortion point, high contents of radicals of $\alpha,\beta$-ethylenically unsaturated dicarboxylic acids, of 0.70 – 0.20 mol/100 g of unsaturated polyester, are preferred.

Suitable copolymerisable vinyl and vinylidene compounds B for use in the dispersions of the invention are the unsaturated monomers customary in polyester technology, which preferably carry $\beta$-substituted vinyl groups or $\beta$-substituted allyl groups, preferably styrene, but also, for example, nuclear-chlorinated and nuclear-alkylated or -alkenylated styrenes, wherein the alkyl groups can contain 1 – 4 carbon atoms, such as, for example, vinyltoluene, divinylbenzene, $\alpha$-methylstyrene, tert.-butylstyrene and chlorostyrenes; vinyl esters of carboxylic acids with 2 – 6 carbon atoms, preferably vinyl acetate; vinylpyridine, vinylnaphthalene, vinylcyclohexane, acrylic acid and methacrylic acid and/or their esters (preferably vinyl, allyl and methallyl esters) with 1 – 4 carbon atoms in the alcohol component, their amides and nitriles, maleic anhydride, maleic acid half-esters and diesters with 1 – 4 carbon atoms in the alcohol component, maleic acid half-amides and diamides or cyclic imides such as N-methylmaleimide or N-cyclohexylmaleimide; allyl compounds, such as allylbenzene and allyl esters such as allyl acetate, phthalic acid diallyl ester, isophthalic acid diallyl ester, fumaric acid diallyl ester, allyl carbonates, diallyl carbonates, triallyl phosphate and triallyl cyanurate.

Polymers which are suitable for use as thermoplastics C which reduce the shrinkage, in the sense of the invention, are the following, to the extent that, at room temperature, they are colloidally soluble, in the ratio claimed, in the vinyl or vinylidene compounds B and are incompatible with the polyester resin A + B, for example (1.) Polymers Homopolymers, copolymers and graft copolymers of vinyl, vinylidene and allyl compounds, such as ethylene, propylene, isobutylene, styrene, substituted styrenes (for example vinyltoluene, tert.-butylstyrene, chlorostyrene, divinylbenzene and $\alpha$-methylstyrene), alkyl esters, amides and nitriles of acrylic and methacrylic acid (for example methacrylic acid methyl ester, hydroxypropyl methacrylate, ethylene glycol bismethacrylate and acrylonitrile), maleic anhydride, neutral and acid alkyl esters of maleic acid and fumaric acid, vinyl esters, for example vinyl acetate or vinyl benzoate, adipic acid divinyl ester, vinyl ketones, vinyl halides, for example vinyl chloride, vinylidene halides, vinyl ethers, allyl esters, for example allyl acetate, diallyl phthalate, dimethallyl isophthalate and allyl acrylate and allyl ethers.

In the case of the graft copolymerisation, suitable grafting bases are, for example, rubbery-elastic polymers such as butadiene polymers, for example polybutadiene, butadiene-styrene copolymers, butadiene-acrylonitrile copolymers, isoprene polymers, for example 1,4-cis-polyisoprene, polyacrylic acid esters (for example polyethyl acrylate and polybutyl acrylate), ethylene-propylene terpolymer rubbers (the tercomponent being, for example, 1,5-hexadiene or ethylidenenorbornene) and polyalkenamer rubbers, for example transpolypentenamer, polyhexenamer and polyoctenamer.

(2) Polycondensates

Saturated polyesters, polycarbonates, polysulphones, polyamides, polyimides, alkyd resins, polysilicones, polyethers, polyxylylenes, polyacetals, aminoplasts and cyclohexanone-formaldehyde condensates.

(3.)Polyaddition compounds

Polyurethanes, polycaprolactam, polycaprolactone and epoxide resins.

The polymers which reduce shrinkage can also contain functional groups: Thermoplastic polymers with acid groups, preferably in amounts of 0.04 – 4.0 milliequivalents/g of thermoplastic polymer, for example sulphonic acid, phosphoric acid, phosphonic acid and especially carboxyl groups, are to be preferred to acid-free thermoplastics since they can be thickened with chemical thickeners such as magnesium oxide and give moulding materials which in general exhibit the best processing properties.

The following are preferred: homopolymers, copolymers and graft polymers of styrene, substituted styrenes, acrylic acid, methacrylic acid and their esters or amides, acrylonitrile, maleic anhydride, neutral or acid esters of maleic acid or fumaric acid and elastomers, based on rubbery-elastic diene polymers, graft-polymerised with the vinyl or vinylidene monomers mentioned.

The molecular weight, measured as a numerical average $\overline{M}_n$, of the thermoplastic polymers can be between 500 and 10,000,000. In the case of the polymers, molecular weights of 10,000 to 500,000 are preferred and in the case of the polycondensates and polyaddition compounds those of 500 to 5,000 are preferred.

The thermoplastic polymers C which reduce the shrinkage are incompatible with the polyester resin A + B if two phases are clearly recognisable in the dispersion A + B + C or in the stabilised dispersions A + B + C + D in an optical microscope or with the aid of an electron microscope.

The dispersions according to the invention are most suitably prepared by combining three solutions in copolymerisable vinyl or vinylidene compounds B, of which the first contains the polyester A, the second the thermoplastic polymer C and the third the dispersion stabiliser D, whilst stirring, at room temperature or slightly elevated temperature (that is to say at 20° – 50° C). The dispersing can be effected with the customary stirring equipment, and the fineness and viscosity of the dispersion can, as is known to those skilled in the art, be regulated by varying the rate of stirring and the period of stirring. The dispersion stabiliser D can also be dissolved together with the polyester A or together with the thermoplastic polymer C to form one solution, so that only two solutions have to be combined to give the dispersion according to the invention.

The dispersions according to the invention show a shelf life of several months when stored at room temperature. They can optionally additionally contain small amounts of water (0.1 to 1.0% by weight, relative to the unstabilised dispersion A - C) and/or thixotropic agents, which has a favourable influence on their shelf life.

As thixotropic agents it is possible to use the customary agents, for example inorganic agents, such as Aerosil, or organic agents, such as polyisocyanates, polyester-amides, polyamides, polyurethanes or cyclohexylamides of higher fatty acids (DT-AS (German Published Specification No.) 1,182,816 and 1,217,611 and Belgian Patent Specifications 693,580 and 727,952), in effective amounts.

In order to protect the dispersions according to the invention against undesired premature polymerisation it is advisable to add 0.001–0.1 part by weight, relative to 100 parts by weight of unstabilised dispersion A-C, of polymerisation inhibitors or antioxidants already during manufacture.

Suitable auxiliaries of this type are, for example, phenols and phenol derivatives, preferably sterically hindered phenols which contain alkyl substituents with 1 – 6 C atoms in both o-positions relative to the phenolic hydroxyl group, amines, preferably secondary arylamines and their derivatives, quinones, copper salts of organic acids and addition compounds of copper-(I) halides to phosphites such as, for example, 4,4'-bis-(2,6-di-tert.-butylphenol), 1,3,5-trimethyl-2,4,6-tris-(3,5-di-tert.-butyl-4-hydroxy-benzyl)-benzene, 4,4'-butylidene-bis-(6-tert.-butyl-m-cresol), 3,5-di-tert.-butyl-4-hydroxy-benzyl-phosphonic acid diethyl ester, N,N'-bis-(β-naphthyl)-p-phenylenediamine, N,N'-bis-(1-methylheptyl)-p-phenylenediamine, phenyl-β-naphthylamine, 4,4'-bis-(α,α-dimethylbenzyl)-diphenylamine, 1,3,5-tris-(3,5-di-tert.-butyl-4-hydroxy-hydrocinnamoyl)-hexahydro-s-triazine, hydroquinone, p-benzoquinone, toluhydroquinone, p-tert.-butylpyrocatechol, chloranil, naphthoqinone, copper napthenate, copper octoate, Cu(I)Cl/triphenyl phosphite, Cu(I)Cl/trimethyl phosphite, Cu(I)Cl/trischloroethyl phosphite, Cu(I)Cl/tripropyl phosphite, and p-nitrosodimethylaniline. Further suitable stabilisers are described in "Methoden der organischen Chemie" ("Methods of Organic Chemistry") (Houben-Weyl), 4th Edition, Volume XIV/1, pages 433–452 and 756, Georg Thieme-Verlag, Stuttgart, 1961. A very suitable stabiliser is, for example, p-benzoquinone in a concentration of 0.01 to 0.05 part by weight, relative to 100 parts by weight of unstabilised dispersion A-C.

In order to convert the dispersions according to the invention into moulding and pressing compositions, curing catalysts, if appropriate chemical thickeners, additives which accelerate or regulate the thickening, reinforcing materials, fillers and, optionally, further auxiliaries and additives are usually incorporated into the dispersions.

At any desired point in time before curing, it is possible to add customary amounts, preferably 0.5 to 5 parts by weight, relative to 100 parts by weight of unstabilised dispersion A-C, of polymerisation initiators to the dispersions according to the invention. Examples of suitable initiators are diacyl peroxides such as diacetyl peroxide, dibenzoyl peroxide and di-p-chlorobenzoyl peroxide, peroxy-esters such as tert.-butyl peroxyacetate, tert.-butyl peroxybenzoate and tert.-butyl peroctoate, dicyclohexyl peroxydicarbonate or 2,5-dimethylhexane 2,5-diperoctoate, alkyl peroxides such as bis-(tert.-butyl peroxybutane), dicumyl peroxide and tert.-butyl cumyl peroxide, hydroperoxides such as cumene hydroperoxide, tert.-butyl hydroperoxide, cyclohexanone hydroperoxide and methyl ethyl ketone hydroperoxide, perketals, ketone peroxides such as acetylacetone peroxide, or azoisobutyrodinitrile.

It is possible to add to the dispersions according to the invention the oxides and hydroxides of the metals of the 2nd main group of the periodic system known as chemical thickeners, preferably the oxides and hydroxides of magnesium and calcium, in amounts of 0.1 to 10, preferably 1.0 to 3.0, parts by weight, relative to 100 parts by weight of unstabilised dispersion A-C, as well as additives which accelerate or regulate chemical thickening, such as 0.1 to 0.5 part by weight of water or additives according to DT-AS (German Published Specification No.) 1,544,891, for example aliphatic carboxylic acids or partial phosphoric acid esters, in effective amounts.

Furthermore, the moulding materials prepared from the dispersions according to the invention can contain 5 – 100, preferably 10 – 40, parts by weight, relative to the unstabilised dispersion A-C, of preferably fibrous reinforcing materials.

Suitable fibrous reinforcing materials are, as usual, inorganic fibres such as metal fibres, asbestos fibres, carbon fibres and especially glass fibres, and organic fibres, for example cotton fibres, polyamide fibres, polyester fibres, polyacrylonitrile fibres or polycarbonate fibres.

Inorganic fillers which are usually employed in amounts of 50 – 350 parts by weight, relative to 100 parts by weight of the unstabilised dispersion A-C, are, for example, chalk, talc, quartz powder and slate powder, kaolin, calcite, dolomite, mica, baryte, kieselguhr and aluminas.

Customary additives which an be co-used are, for example, organic and inorganic pigments, dyestuffs, lubricants and release agents, such as zinc stearate, UV absorbers and the like.

The mixing of the various components of the moulding materials to be produced from the dispersions according to the invention is suitably effected in kneaders or dissolvers or on mills.

Larger mouldings are most economically manufactured from thickened resin mats. These are manufactured by imprenating glass fibre mats with the glass fibre-free moulding materials described above, which contain chemical thickeners, and protecting the surface on both sides of the mats by covering films. The films prevent the evaporation of the vinyl or vinylidene compounds and permit rolling-up of the mats and hence permit space-saving storage. After the resin mats have been thickened, after a ripening time of about 1 – 10 days, the covering films can be pulled off and the resin mats can be appropriately cut to shape and hot-pressed to give mouldings showing little shrinkage.

They can be cured under a pressure of about 20 – 140 kp/cm$^2$ at about 120° – 160° C, in about 0.5 – 5 minutes depending on size and shape, giving mouldings with minimal shrinkage.

The degree of shrinkage depends considerably on the processing method; compare Schulz-Walz and O. Walter, Kunststoff-Rundschau, 1972, Issue 11, page 592:
1. Pressings in which the reinforcing fibres are oriented in the pressing direction shrink substantially less than those in which the reinforcing fibres lie transversely to the pressing direction.
2. The shrinkage increases with increasing press pressure.
3. The surface gloss and surface smoothness increase with increasing mould temperature. However, if a certain temperature is exceeded, matt blotches appear.
4. The surface gloss can be increased considerably by lengthening the pressing time.
5. The tendency to form blotches decreases the more, the slower the catalyst system reacts, that is to say the higher is the start temperature of the catalyst.

Summarising, it can be stated that the reaction shrinkage of a polyester resin which can be cured with little shrinkage depends on the pressure. This not only means that the shrinkage turns out differently depending on the press pressure but that it also occurs to different degrees within the pressing, depending on the position, direction, glass fibre orientation or material thickness.

The mouldings produced from the moulding materials described earlier show very little linear shrinkage, little depth of sink marks opposite thickened areas of material, no recognisable glass fibre structure and above all smooth surfaces. They can therefore be employed advantageously wherever mouldings of high dimensional accuracy and flawless surface are desired (in the furniture field and car industry).

The examples which follow illustrate the invention. Percentages denote percentages by weight.

The viscosity data are based on measurements in the Höppler falling ball viscometer at 20° C.

Component A + B

Component A + B is the solution of an unsaturated polyester in styrene. The unsaturated polyester is prepared in a known manner by melt condensation at 180° C under a nitrogen atmosphere until the desired acid number is reached. Hydroquinone is subsequently added to the polyester melt at about 120° C and thereafter an 80% strength solution thereof in styrene is prepared. The composition of the starting components of the polyester and the characteristic data of the styrene solution are tabulated:

|  | g |
|---|---|
| maleic anhydride | 785 |
| phthalic anhydride | 296 |
| 1,2-propylene glycol | 631 |
| dipropylene glycol | 335 |
| hydroquinone | 0.57 |

| Characteristic data of the styrene solution | |
|---|---|
| solids content | 80% |
| viscosity (20° C) | 66,000 cP |
| acid number | 23 mg of KOH/g |

Component B + C

The components B + C 1 to B + C 3 tabulated below are 40% strength solutions of thermoplastic polymers in styrene having the indicated characteristic data; they are prepared by warming a mixture of B and C 1 or C 2 or C 3 to about 70° C.

| Component | B + C1 g | B + C2 g | B + C3 g |
|---|---|---|---|
| neutral polystyrene [1] | 400 | — | — |
| acid polystyrene [2] | — | 400 | — |
| polymethyl methacrylate [3] | — | — | 400 |
| styrene | 600 | 600 | 600 |
| viscosity cP | 32,000 | 47,000 | 21,500 |

[1]Vestyron ®114–30 / Chem. Werke Huls
[2]Copolymer of 1% by weight of acrylic acid and 99% by weight of styrene
[3]Plexiglas ®X8N / Rohm & Haas Component B + D Component B + D is a 20% strength solution of a dispersion stabiliser in styrene, the stabiliser being an ethylene/vinyl acetate copolymer with a vinyl acetate content of 70% and having a Mooney value of 54, measured according to DIn 53,523 L 4.

Preparation of the dispersions according to the invention

EXAMPLES 1 – 3 a

To prepare the examples according to the invention, the component A + B, B + C, B + D and styrene are stirred together, in the weight ratio shown in the table, for 30 minutes at room temperature in a round flask having a blade stirrer, whereby dispersions having the stated viscosities are produced. The comparison experiments, each designated a, only contain styrene instead of component B + D. The last line of the table shows the storage time at room temperature after which a phase separation can be observed.

| Example No. | 1 | 1a | 2 | 2a | 3 | 3a |
|---|---|---|---|---|---|---|
| Component A + B | 60 | 60 | 60 | 60 | 50 | 50 |
| Component B + C1 | 30 | 30 | — | — | — | — |

-continued

| Example No. | 1 | 1a | 2 | 2a | 3 | 3a |
|---|---|---|---|---|---|---|
| Component B + C2 | — | — | 30 | 30 | — | — |
| Component B + C3 | — | — | — | — | 30 | 30 |
| Component B + D | 10 | — | 10 | — | 20 | — |
| Styrene | — | 10 | — | 10 | — | 20 |
| Viscosity(cP) | 4,180 | 1,140 | 3,080 | 1,550 | 6,600 | 1,000 |
| Storage time: | >5 months | 20 mins. | >5 months | 15 mins. | >5 months | 30 mins. |

The storage time of the examples according to the invention clearly shows the technical advance over the comparison examples.

Preparation of a resin mat from the dispersion according to the invention, according to EXAMPLE 2

100 parts by weight of the dispersion according to Example 2 are mixed homogeneously with the additives listed below by means of a dissolver and a glass fibre mat is impregnated with the resulting paste in the stated ratio; the mat is then protected on both sides with covering films and stored for 7 days at room temperature.

| Composition of the resin mat: parts by weight | |
|---|---|
| 100.00 | dispersion according to Example 2 |
| 100.00 | calcium carbonate |
| 1.50 | magnesium oxide |
| 4.00 | zinc stearate |
| 1.65 | black iron oxide |
| 3.35 | red iron oxide |
| 0.75 | tert.-butyl perbenzoate |
| 52.80 | glass fibre mat |

Production of moulding

After 7 days' storage of the resin mat at room temperature, the covering films are pulled off, which is done very easily and wihout any damage to the mat, since the latter has a dry, tack-free surface. 125 g of the thickened resin mat are pressed to form a sheet (12 × 12 cm) having a diagonal rib and a nap, for 5 minutes at 145° C under 120 kp/cm$^2$. The linear percentage shrinkage, measured over the diagonal rib of the cured sheet, is only 0.043%. The sheet is homogeneously coloured and shows no warping.

We claim:

1. An organic dispersion which consists essentially of:
   (A) 20–70% by weight of an $\alpha,\beta$-ethylenically unsaturated polyester;
   (B) 20–70% by weight of a copolymerizable vinyl or vinylidene compound;
   (C) 3–30% by weight of a thermoplastic polymer which is colloidally soluble in component B, incompatible with a composition comprising components A plus B and which consists essentially of polystyrene, polyacrylic acid ester or polymethacrylic acid ester; and
   (D) 0.001–20% by weight of ethylene/vinyl acetate copolymer having a vinyl acetate content of 50–80% by weight and a Mooney viscosity of 8–60 measured according to DIN 53,523 (L-4), said percentages by weight being based on the sum of weights of components A, B and C.

2. The organic dispersion of claim 1 consisting essentially of 30–50% by weight of component A; 40–60% by weight of component B; 5–20% by weight of component C and 0.15–10% by weight of component D.

3. The organic dispersion of claim 1 wherein the vinyl acetate content of component D is 60–75% by weight and the Mooney viscosity thereof is 45–65.

4. The organic dispersion of claim 1 wherein the acid number of component A is 10–100, the OH number thereof is 10–150 and the molecular weight thereof is 500–5000.

5. The organic dispersion of claim 1 containing 0.1 to 1.0% by weight, based on the sum of the weights of components A, B and C, of water.

* * * * *